UNITED STATES PATENT OFFICE 2,048,006

MANUFACTURE OF AROMATIC PARA-AMINO-ALDEHYDES

Donald Hutton, Carneys Point, N. J., assignor to E. I. du Pont de Nemours & Company, Wilmington, Del., a corporation of Delaware No Drawing. Application October 26, 1934, Serial No. 750,133

9 Claims. (Cl. 260—128)

This invention relates to the manufacture of aromatic p-amino aldehydes. It is an object of this invention to provide an improved process for the manufacture of p-amino-aldehydes, whereby the same may be obtained economically and in good yield. Other and further important objects of this invention will appear as the description proceeds.

The preparation of aromatic para-amino-aldehydes and derivatives thereof is described in German Patents Nos. 103,578, 105,103, and 105,105. The essentials of this process as described in the above specification is illustrated by the following discussion as applied to the manufacture of para-dimethylamino-benzaldehyde.

(1) Nitro-benzene sulfonic acid or ortho or para-nitrotoluene sulfonic acid is reduced in neutral solution with zinc dust to the corresponding phenyl-$\beta$-hydroxylamine. The zinc oxide formed is either filtered off or dissolved by adding acid.

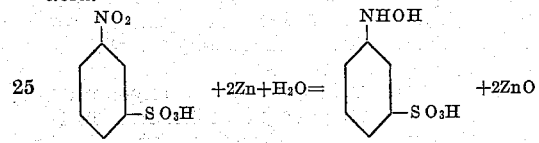

(2) The phenyl-$\beta$-hydroxylamine derivative thus prepared in aqueous solution is condensed with the para-amino-benzyl alcohol corresponding to the desired para-amino-aldehyde. Generally, this para-amino-benzyl alcohol is prepared in situ from the corresponding aromatic amine, formaldehyde, and acid.

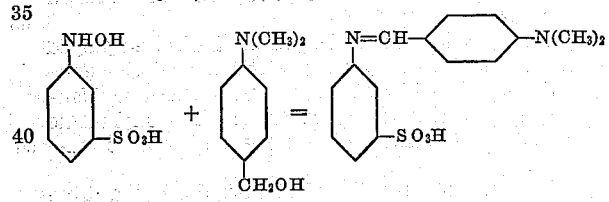

(3) The condensation product so obtained, which will be hereinafter referred to as the benzylidene compound, azo-methine compound, or Schiff's base, is then hydrolyzed to the para-amino-benzaldehyde.

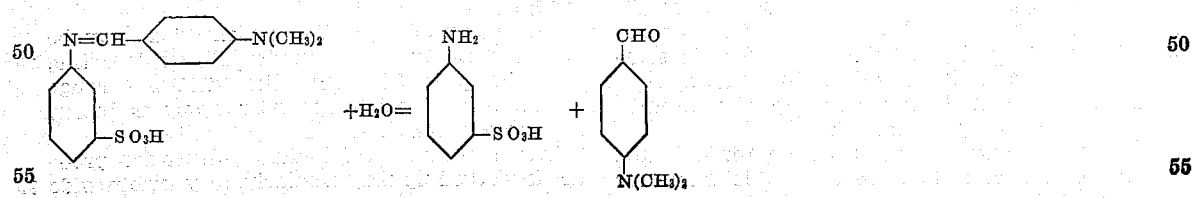

Modifications are described in these specifications, but the principle is not far removed.

I have now found that the yield of the Schiff's base, and consequently also of the desired final product, is considerably increased if, in the step of condensing the aryl-hydroxylamine with the para-amino-aryl-methanol, one adds to the reaction mass a primary aromatic amine. Since the aryl-hydroxylamine is itself eventually regenerated in the form of an aromatic amine, it is advantageous from the mere viewpoint of separation and recovery to select as assistant such an arylamine as corresponds to the one formed eventually by the hydroxylamine. For instance, in the above specific example, it is advantageous to choose metanilic acid as the assistant. The point, however, is merely a matter of convenience or efficiency, and is not essential to the improvement in yield, which is the main aim of this invention.

That the addition of a primary arylamine would have such a beneficial influence upon the yield is an entirely unexpected effect. From the viewpoint of the law of mass action, it might have been expected that an increase in the proportion of the hydroxylamine itself would push the consumption of the other reactant, the p-amino-alcohol, nearer to completeness. But that a primary arylamine would have such an effect was entirely beyond theoretical prediction. Indeed, I find that the addition of a primary amine is far superior, for the purpose of increasing the consumption of the amino-alcohol, to the use of an excess of the hydroxylamine.

The nature of the added primary arylamine may vary within wide limits. It may or may not contain sulfonic acid groups. It may be solid or liquid, and may be added as free base or in the form of its hydrochloride or other readily-soluble salt. Of course, as already mentioned, it should best be selected identical with the arylamine producible by reduction of the hydroxylamine employed. The advantage here is that the eventual reaction mass after hydrolysis of the Schiff's base will contain but a single aromatic amine next to the para-amino-aldehyde produced. The point, however, is not essential.

The quantity of arylamine to be added as assistant may vary within wide limits. Its action being apparently catalytic, I find that even minute proportions of the assistant produce a decided improvement upon the yield. On the other hand, larger proportions are not harmful, except of course that they constitute waste of material. In practice 0.05 mol to 1 mol per mol of the arylamino-alcohol may be employed, with the optimum probably in the neighborhood of 0.1 to 0.2 mols.

Where the arylamine added is identical with the arylamine residue in the para-amino-alcohol employed, the latter may be manufactured in situ by reacting the arylamine with formaldehyde and acid in the presence of the aryl-hydroxylamine, as disclosed for instance in German Patent No. 103,578, above referred to. In all other cases it is preferable to manufacture the aminoalcohol separately, and mix it later with the hydroxylamine and the assistant primary amine, as by this procedure reaction between the assistant amine and formaldehyde is avoided. The latter reaction, however, can be avoided in other ways, for instance by choosing as assistant a para-substituted arylamine. Or again, the formation of a by-product para-amino-aryl-aldehyde in addition to the main product desired may not be considered objectionable, since the two can in certain cases be readily separated after the reaction is otherwise finished.

My improvement appears applicable with good success to the manufacture of all varieties of para-amino-aldehydes, whether of the benzene series or naphthalene series, whether sulfonated or not, as indicated by the numerous typical examples in the German patents above referred to.

Without limiting my invention to any particular procedure, the following examples, in which parts by weight are given, will serve to illustrate my preferred mode of operation.

Example I

Dissolve 382 parts nitrobenzene-meta-sulfonic acid (sodium salt) in 1700 parts water. If necessary, add hydrochloric acid to make solution just acid to litmus paper. Then add 62 parts ammonium chloride.

Now, with very good agitation, add slowly, during about ½ hour, 230 parts of zinc dust. The temperature generally will rise sharply to 60-70° centigrade, and thereafter should be held in this range by external cooling. When the reaction is over, as shown by no further heat of reaction, cool to 40-50° centigrade, and at that temperature add hydrochloric acid until the zinc oxide is dissolved. Filter to remove a slight residue of unreacted zinc. The filtrate contains 3-sulfo-phenyl-hydroxylamine.

Add the above solution to a mixture of 185 parts diethyl-amine, 210 parts of 20° Bé. hydrochloric acid, and 103 parts formaldehyde solution. Then add 240 parts metanilic acid and neutralize any acidity to Congo red paper by the careful addition of aqua ammonia.

Now heat to 40-45° centigrade for 4 hours. Then cool to room temperature and let stand for about 18 hours. Filter off the condensation product, which constitutes 4'-diethylamino-benzylidene-aniline-3-sodium (or ammonium ?)-sulfonate.

To isolate the aldehyde, boil this condensation product with 1300 parts of 5% aqueous ammonia for 15 minutes. The crude para-N-diethyl-amino-benzaldehyde forms as an oil, which is separated. This oil is then purified either by distillation in vacuo or by crystallization from dilute alcohol, for example.

Example II

Dissolve 410 parts para-nitro-toluene-ortho-sulfonic acid (sodium salt) in 1000 parts of water and adjust the solution so that it is just acid to litmus paper. Add 65 parts of ammonium chloride. Then reduce by adding slowly, during about ½ hour, 250 parts zinc dust. Hold the temperature below 80° centigrade by adding ice as needed. Good agitation is, of course, essential.

When the reduction is finished, as shown by no further tendency of the temperature to rise, filter off the precipitated zinc oxide. The filtrate is a solution of 3-sulfo-4-methyl-phenyl-hydroxylamine.

To this solution add at once 121 parts dimethyl-aniline, 60 parts commercial formic acid, and 26 parts para toluidine ortho sulfonic acid. Now add, during 1½ to 3 hours, 120 parts of formaldehyde solution. Allow the mild heat of reaction to carry the temperature to 60° centigrade, but no higher. Hold the temperature above 50° centigrade for a further 4 hours, and let stand for 48 hours at room temperature.

At the end of that time filter off the condensation product. It may then be hydrolyzed in a manner similar to that used in Example I. In this case, however, the dimethyl-amino-benzaldehyde may conveniently be isolated by cooling the hydrolysis mass to 15-20° centigrade, and filtering off the crystalline product. The crude para N-dimethyl-amino-benzaldehyde may then be purified in any known manner.

Instead of the specific phenyl-hydroxylamines mentioned in the above examples, other hydroxylamines customarily employed for this type of reaction may be employed, for instance that prepared from ortho-nitro-toluene-sulfonic acid or that corresponding to alpha-nitro-naphthalene. Also, the step of preparing the hydroxylamine from the corresponding nitro compound by reduction with zinc dust is not part of this invention, as it may be prepared in any known manner.

The quantity of aryl-hydroxylamine employed in the reaction may vary within the limits generally employed in the art for this reaction. Usually, about 1 to 1.5 mols of the hydroxylamine per mol of para-amino-aryl-methanol is employed.

In place of the dimethyl and diethyl aniline used in the examples for forming the nucleus of the eventual para-amino-aldehyde, one may use any aryl mono amine whether primary, secondary or tertiary, or a derivative thereof which is not substituted in the para position to the amino group.

The conditions in the condensation may be varied in any known manner without departing from the spirit of this invention. The wide range of conditions which one may apply is briefly indicated in the examples.

The manner in which the condensation product is worked up may similarly vary within wide limits, as readily understood by those skilled in the art.

The advantages of this invention lie in the greatly improved yield and consequently the much lower cost of those aldehydes when prepared by this method. In some cases as much as 50% increase in yield has been obtained.

In the claims below the phrase "an azo-methine compound" will be understood as referring to a compound which possesses the grouping —CH=N—, as typified, for instance, by the reaction product in the second equation at the beginning of this specification.

I claim:

1. In the process of producing a para-amino-aryl-aldehyde by condensing a para-amino-aryl-methanol with an aromatic hydroxylamine to produce an azo-methine compound and then hydrolyzing the azo-methine compound, the improvement which comprises effecting said condensation in the presence of a primary aromatic amine.

2. In the process of producing a para-amino-aryl-aldehyde by condensing a para-amino-aryl-methanol with an aromatic hydroxylamine sulfonic acid to produce an azo-methine compound and then hydrolyzing the azo-methine compound, the improvement which comprises effecting said condensation in the presence of a primary aromatic amine sulfonic acid.

3. In the process of producing a para-amino-aryl-aldehyde by condensing a para-amino-aryl-methanol with an aromatic hydroxylamine to produce an azo-methine compound and then hydrolyzing the azo-methine compound to produce a para-amino-aryl-aldehyde and a primary aromatic amine, the improvement which comprises effecting said condensation in the presence of a primary aromatic amine identical with the primary amine eventually produced in the hydrolysis of the azo-methine compound.

4. The process which comprises condensing a para-amino-aryl-methanol with an aromatic hydroxylamine in the presence of a primary aromatic amine containing no methylol groups to produce an azo-methine compound, and hydrolyzing the condensation product to produce a primary aromatic amine and a para-amino-aryl-aldehyde.

5. The process which comprises condensing a para-amino-aryl-methanol with an aromatic hydroxylamine sulfonic acid in the presence of a primary aromatic amine sulfonic acid not containing any methylol groups to produce an azo-methine compound, and hydrolyzing the condensation product to produce a primary aromatic amine sulfonic acid and a para-amino-aryl-aldehyde.

6. The process which comprises reacting substantially 1 mol of a para-amino-aryl-methanol with from 1 to 1.5 mols of an aromatic hydroxylamine and from 0.05 mol to 1 mol of a primary arylamine having no methylol groups, in aqueous acid medium, and recovering the resulting condensation product.

7. The process which comprises reacting substantially 1 mol of a para-amino-benzyl-alcohol with from 1 to 1.5 mols of an aromatic hydroxylamine sulfonic acid of the benzene series and from 0.05 mol to 1 mol of a primary arylamine sulfonic acid of the benzene series containing no methylol groups, in aqueous acid medium, and recovering the resulting benzylidene-aniline type condensation product.

8. The process which comprises reacting, in aqueous hydrochloric acid medium, substantially 1 mol of a para-dialkyl-amino-benzyl-alcohol with from 1 to 1.5 mols of a sulfo-phenyl-hydroxylamine and from 0.1 to 0.2 mol of an aniline-sulfonic acid corresponding in structure to said sulfo-phenyl-hydroxylamine, and recovering the resulting para-dialkyl-amino-benzyl-idene-aniline-sulfonic acid.

9. The process which comprises reacting an arylamine having a free para position with formaldehyde in aqueous hydrochloric acid containing further an aromatic hydroxylamine, adding an aromatic amine identical with the compound obtainable by reduction of said aromatic hydroxylamine, neutralizing the acidity of the reaction mass, and recovering the azo-methine compound formed in the reaction.

DONALD HUTTON.

CERTIFICATE OF CORRECTION.

Patent No. 2,048,006.                                           July 21, 1936.

DONALD HUTTON.

It is hereby certified that error appears in the printed specification of the above numbered patent requiring correction as follows: Page 2, first column, line 69, for the hyphenated word "diethyl-amine" read diethyl-aniline; and that the said Letters Patent should be read with this correction therein that the same may conform to the record of the case in the Patent Office.

Signed and sealed this 8th day of December, A. D. 1936.

Henry Van Arsdale (Seal)                                        Acting Commissioner of Patents.